(12) United States Patent
Niito (10) Patent No.: US 6,603,116 B2
(45) Date of Patent: Aug. 5, 2003

(54) METHOD AND APPARATUS FOR IMAGE FORMING WITH MULTIPLE LASER BEAMS

(75) Inventor: Yoshiharu Niito, Kanagawa-ken (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/091,403

(22) Filed: Mar. 7, 2002

(65) Prior Publication Data

US 2002/0125416 A1 Sep. 12, 2002

(30) Foreign Application Priority Data

Mar. 7, 2001 (JP) .................................. 2001-063696

(51) Int. Cl.[7] .................................................. H01J 3/14
(52) U.S. Cl. ........................... 250/234; 347/235; 355/84
(58) Field of Search ................................. 250/234, 235, 250/236, 578.1; 347/235, 237, 233, 250; 355/84, 89, 110, 113, 114; 358/481; 359/204, 216, 217; 399/177; 396/155; 362/3, 257

(56) References Cited

U.S. PATENT DOCUMENTS

| | | |
|---|---|---|
| 4,823,151 A | 4/1989 | Miura |
| 4,933,549 A | 6/1990 | Fujioka et al. |
| 5,821,978 A | 10/1998 | Yamamoto et al. |
| 5,966,231 A * | 10/1999 | Bush et al. .................. 359/204 |
| 6,222,611 B1 * | 4/2001 | Asada ........................ 355/35 |
| 6,473,110 B1 * | 10/2002 | Matsuo ....................... 347/235 |
| 6,483,529 B1 * | 11/2002 | Ito et al. ..................... 347/235 |

FOREIGN PATENT DOCUMENTS

| | | |
|---|---|---|
| EP | 1 024 012 | 8/2000 |
| JP | 6-227037 | 8/1994 |
| JP | 6-300980 | 10/1994 |
| JP | 9-174924 | 7/1997 |
| JP | 2000-118038 | 4/2000 |

\* cited by examiner

Primary Examiner—Kevin Pyo
Assistant Examiner—Seung C. Sohn
(74) Attorney, Agent, or Firm—Oblon, Spivak, McClelland, Maier & Neustadt, P.C.

(57) ABSTRACT

An image forming apparatus includes a light source, a light beam controlling mechanism, a sensor, and a signal controller. The light source emits parallel light beams with an angle smaller than 90° relative to a sub-scanning direction. The light beam controlling mechanism controls a scanning of the light beams. The sensor detects one of the light beams and generates a line synchronous signal. The signal controller delays the data streams and generates PLL clock signals divided into different clock signals having a same frequency and having phases sequentially varied. The signal controller selects one of the different clock signals and drives the light source with the selected clock signal.

18 Claims, 11 Drawing Sheets

METHOD AND APPARATUS FOR IMAGE FORMING WITH MULTIPLE LASER BEAMS

BACKGROUND OF THE INVENTION

1. Field of the Invention

The disclosed invention is directed to a method and apparatus for image forming, and more particularly to a method and apparatus for image forming that uses multiple laser beams.

2. Discussion of the Background

A high speed printing and a high resolution are increasingly demanded for electrophotographic technology and a multiple laser beam technique has recently been developed as one solution. The multiple laser beam technique typically uses a laser diode array that includes a plurality of laser diodes generally arranged in line in a direction relative to a sub-scanning direction of the laser beams. In practice, the laser diode array is mounted in an optical system in such a way that the laser diode array has an angle smaller than 90° relative to a direction corresponding to a main scanning direction of the laser beams. This is to justify a pitch of lines drawn down in a sub-scanning direction on a surface of a writing member (e.g., a photoconductive drum).

In connection with the above-mentioned multiple laser beam technology, several attempts are described in published Japanese unexamined patent applications No. 2000-118038, No. 06-227037, No. 06-300980, and No. 09-174924, for example.

However, the above-mentioned laser diode array has a drawback. That is, when the laser diode array including laser diodes is mounted with a slanting angle, the lines drawn down by the laser beams have an undesired pitch or a displacement in a main scanning direction. To eliminate such an undesired pitch in the main scanning direction, a beam detection for synchronization is required for each of the laser diodes. However, since a distance between any adjacent two of the laser diodes is relatively small, the beam detection for synchronization for each of the laser diodes cannot easily be performed. Therefore, an issue arises as to how to eliminate such an undesired pitch in the main scanning direction.

In addition, this laser diode array having laser diodes with a slanting angle, as described above, involves another drawback. That is, some optical systems may require a reversed slanting direction of laser diodes due to a structural reason, for example. In this case, if a beam detection on a specific laser beam (e.g., typically a laser beam of a channel 1) for synchronization is conducted, this optical system is required to perform a relatively complex control of a synchronization because the channel-1 laser beam of the laser diode array in the reversed slanting direction draws a line at an innermost position in the main scanning direction.

SUMMARY OF THE INVENTION

Accordingly, one object of the present invention is to describe a novel image forming apparatus with improvements.

In one example, this novel image forming apparatus includes a light source, a light beam controlling mechanism, a sensor, and a signal controller.

The light source includes a plurality of light emitting elements arranged in line for simultaneously emitting a plurality of parallel light beams. The light source is arranged with an angle smaller than 90° relative to a sub-scanning direction of the plurality of parallel light beams. The light beam controlling mechanism is configured to control the plurality of parallel light beams to simultaneously scan a plurality of lines on a surface of a photoconductive member in a main scanning direction. The sensor is configured to detect one of the plurality of parallel light beams and to generate a line synchronous signal upon detecting the one of the plurality of parallel light beams. The signal controller is configured to synchronize and to modulate a plurality of parallel image data streams that respectively drive the plurality of light emitting elements of the light source to emit the plurality of parallel light beams in accordance with the plurality of parallel image data streams.

In this novel image forming apparatus, the controller may include a plurality of FIFOs, a PLL circuit, a frequency divider, a synchronous clock generator, and a plurality of drivers. The plurality of FIFOs are configured to delay the plurality of parallel data streams, respectively. The PLL circuit is configured to generate a PLL clock signal having an integral multiple frequency of a pixel clock signal. The frequency divider is configured to divide the PLL clock signal into a plurality of clock signals having a same frequency and having phases sequentially varied. The synchronous clock generator is configured to select one of the plurality of clock signals having the same frequency and having the phases sequentially varied. The plurality of drivers are arranged and configured to drive the plurality of light emitting elements, respectively, with the one of the plurality of clock signals selected by the synchronous clock generator.

The light source may be a laser diode array including a plurality of laser diodes.

The sensor may arbitrarily be set to detect a predetermined one of the plurality of parallel light beams.

The predetermined one of the plurality of parallel light beams may be a light beam emitted by a light emitting element for scanning a line on the surface of the photoconductive member ahead of other light beams in the main scanning direction.

Another object of the present invention is to describe a novel method of image forming with improvements.

In one example, this novel method of image forming includes the steps of arranging, causing, detecting, inputting, providing, dividing, selecting, separating, delaying, synchronizing, modulating, and driving.

The arranging step arranges a light source with an angle smaller than 90° relative to a sub-scanning direction of a photoconductive member. The light source includes a plurality of light emitting elements in line. The causing step causes the plurality of light emitting elements to simultaneously emit a plurality of parallel light beams. The detecting step detects one of the plurality of parallel light beams and generates a line synchronous signal upon detecting the one of the plurality of parallel light beams. The inputting step inputs image data. The providing step provides a PLL clock signal having an integral multiple frequency of a pixel clock signal. The dividing step divides the PLL clock signal into a plurality of pixel clock signals having a same frequency and having phases sequentially varied. The selecting step selects one of the plurality of pixel clock signals having the same frequency and having the phases sequentially varied. The separating step separates the image data into a plurality of parallel data streams. The delaying step delays the plurality of parallel data streams, respectively, with the one of the plurality of pixel clock signals selected in the selecting step. The synchronizing step synchronizes the plurality of parallel image data streams with the one of the plurality of pixel clock signals selected in the selecting step. The modulating step modulates a plurality of driving signals with the plurality of parallel image data streams. The driving step drives the plurality of light emitting elements with the plurality of parallel image data streams, respectively, synchronized in the synchronizing step.

The arranging step may arrange a laser diode array including a plurality of laser diodes.

The detecting step may arbitrarily detect a predetermined one of the plurality of parallel light beams.

The predetermined one of the plurality of light beams may be a light beam emitted by a light emitting element for scanning a line on the surface of the photoconductive member ahead of other light beams in the main scanning direction.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 1:
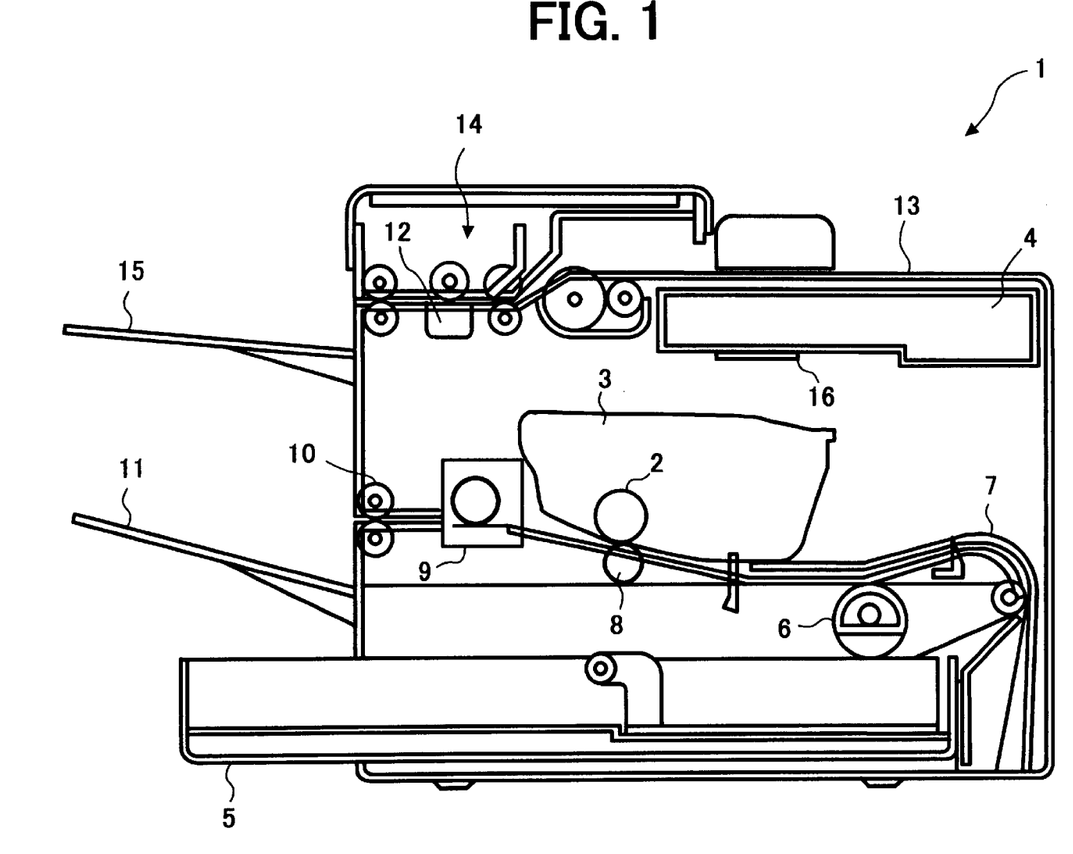
FIG. 1 is a block diagram of an image forming apparatus according to a preferred embodiment of the present invention.

Referring now to the drawings, wherein like reference numerals designate identical or corresponding parts throughout the several views, and more particularly to FIG. 1 thereof, an electrophotographic digital copying apparatus 1 according to a preferred embodiment of the present invention is explained. As shown in FIG. 1, the digital copying apparatus 1 includes a photoconductive drum 2, a development unit 3, an optical writing unit 4, a sheet cassette 5, a sheet feed roller 6, a sheet guide 7, a transfer roller 8, a fixing unit 9, an ejection roller 10, and an ejection tray 11. The digital copying apparatus 1 further includes an image sensor 12, a document plate 13, a document transporting mechanism 14, a document tray 15, and an optical writing controller 16.

The development unit 3 is rotatably mounted to the digital copying apparatus 1, and performs an image development process according to electro photography. The optical writing unit 4 generates laser light and scans the surface of the rotating photoconductive drum 2 with the laser light modulated in accordance with image data under the control of the optical writing controller 16. The sheet cassette 5 contains recording sheets. The sheet feed roller 6 feeds a recording sheet to the sheet guide 7 that guides the recording sheet to an image transferring position between the photoconductive drum 2 and the transfer roller 8. The transfer roller 8 transfers a toner image formed on the photoconductive drum 2 onto the recording sheet and transports the recording sheet carrying the toner image thereon to the fixing unit 9. The fixing unit 9 fixes the toner image and sends the recording sheet having the fixed toner image thereon to the ejection roller 10. The ejection roller 10 ejects the recording sheet onto the ejection tray 11.

The image sensor 12 may be a close-contact type sensor mounted to a midpoint position of a sheet passage formed by the document transporting mechanism 14 to read an image of a document. The document plate 13 is a plate on which at least one sheet of a document to be copied is placed. The document transporting mechanism 14 transports the document from the document plate 13 to the document tray 15.

When copying of a document is started, a document placed on the document plate 13 is automatically inserted into the document transporting mechanism 14. The document is transported to the original tray 15 by the document transporting mechanism 14. During the time the document is passing by the image sensor 12, the image sensor 12 optically reads an image of the document and generates image data in response to the read image. The image data generated by the image sensor 12 is sent to the optical writing unit 4 that generates laser light modulated with the image data and emits the laser light onto the charged surface of the photoconductive drum 2 under the control of the optical writing controller 16. As a result, an electrostatic latent image is formed on the photoconductive drum 2.

The electrostatic latent image thus formed on the photoconductive drum 2 is developed with toner by the development unit 3 into a toner image, which is a visualized image. The toner image is then transferred onto a recording sheet by the transfer roller 8. The recording sheet carrying the toner image thereon is then transported to the fixing unit 9 that applies pressure and heat to the toner image carried on the recording sheet so that the toner image is fixed on the recording sheet. After the fixing process, the recording sheet is ejected by the ejection roller 10 to the ejection tray 11. Thereby, one operational cycle of the electrophotographic copying procedure is completed. In this procedure, image data may be input from an external data source (not shown), e.g. a personal computer, through a data cable (not shown).

Figure 2:
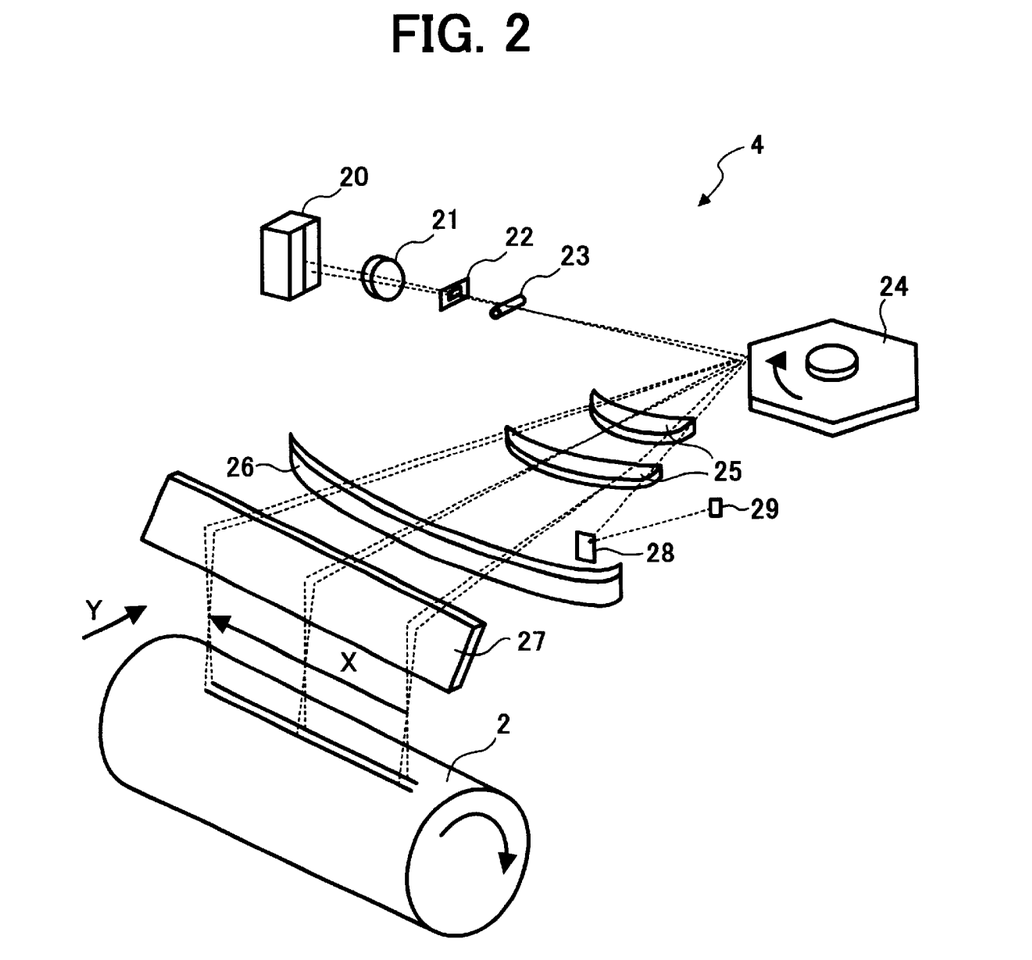
FIG. 2 is a schematic diagram of an optical writing system included in the image forming apparatus of FIG. 1.

FIG. 2 illustrates an exemplary structure of the optical writing unit 4. As illustrated in FIG. 2, the optical writing unit 4 includes a laser diode array device 20, a collimate lens 21, an aperture 22, a cylindrical lens 23, a polygon mirror 24, a pair of fθ lenses 25, a correction lens 26, a mirror 27, a synchronous mirror 28, and a synchronous detection sensor 29. In FIG. 2, a direction parallel to an axis of the photoconductive drum 2 is referred to as a main scanning direction and a direction perpendicular to the axis of the photoconductive drum 2 is referred to as a sub-scanning direction.

Figure 3:
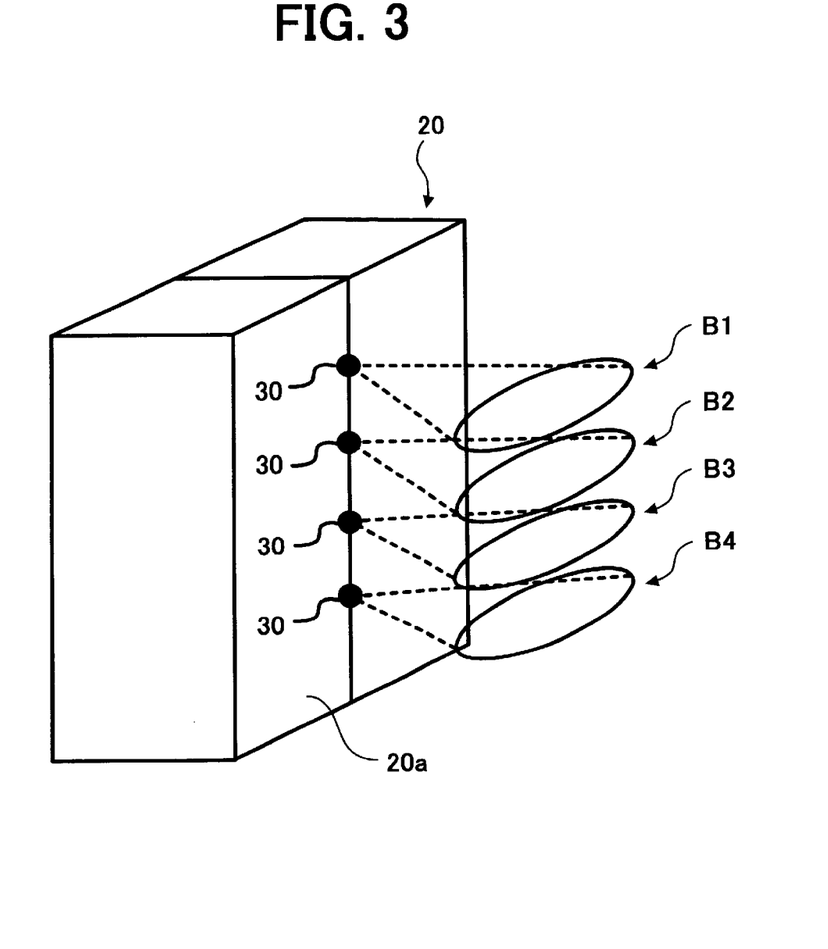
FIG. 3 is an illustration for explaining a laser diode array including a plurality of laser diodes.
Figure 4:
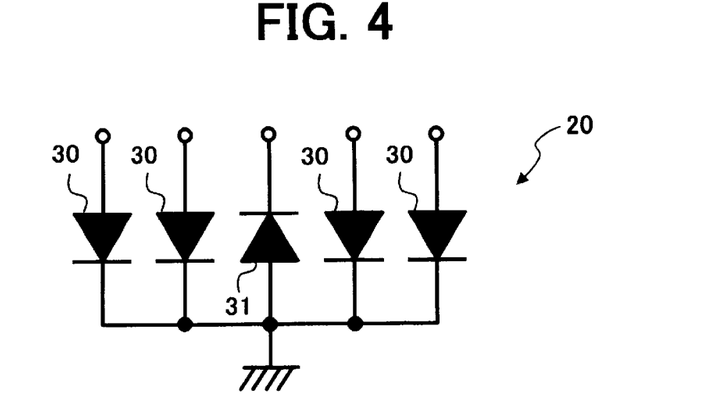
FIG. 4 is a circuit diagram of the laser diode array of FIG. 3.

As illustrated in FIG. 3, the laser diode array device 20 includes a plurality of light emitting elements, e.g., four-channel LDs (laser diodes) 30, arranged in line. In this example, the LDs 30 are independently controlled to emit laser beams B1–B4 that are modulated according to image data. As illustrated in FIG. 3, the laser diode array device 20 has a surface 20a in which the LDs 30 are arranged in line with a predetermined distance between any adjacent two of the LDs 30. FIG. 4 shows an electric circuit diagram of the laser diode array device 20. As shown in FIG. 4, the laser diode array device 20 further includes a photo receiving element 31 (hereinafter referred to as a PD 31).

The laser beams B1–B4 modulated according to image data are formed into predetermined beam shapes through the collimate lens 21, the aperture 22, and the cylindrical lens 23, and are transmitted to the polygon mirror 24. More specifically, the collimate lens 21 makes the laser beams B1–B4 parallel, and the aperture 22 that has a slit formed in accordance with a writing density shapes the parallel laser beams B1–B4 by cutting out undesired beam portions. The cylindrical lens 23 brings each of the laser beams B1–B4 into focus so that each of the laser beams B1–B4 will have a predetermined beam diameter to form a spot of a predetermined size on the surface of the photoconductive drum 2. The cylindrical lens 23 transmits the thus focused laser beams B1–B4 to the polygon mirror 24.

The laser beams B1–B4 impinge on the polygon mirror 24, which is rotated at a predetermined speed, and are transmitted to the mirror 27 so that the laser beams B1–B4 scan the mirror 27. The mirror 27 is fixed with an angle relative to the propagation direction of the laser beams B1–B4 so as to reflect the laser beams B1–B4 towards the surface of the photoconductive drum 2. Thereby, the laser beams B1–B4 scan the surface of the photoconductive drum 2 in the main scanning direction X. During this process, after being reflected by the polygon mirror 24, the laser beams B1–B4 propagating at a constant angular speed are converted into beams propagating at a constant speed by the pair of the fθ lenses 25 and are corrected by the correction lens 26. After that, the laser beams B1–B4 have their directions changed towards the photoconductive drum 2 by the mirror 27.

When the laser beams B1–B4 are caused to scan the surface of the photoconductive drum 2, they lay down four trails, having a predetermined pitch between any adjacent two laser beams, on the surface of the photoconductive drum 2 in the sub-scanning direction Y.

The synchronous mirror 28 is, as shown in FIG. 2, mounted in a laser beam passage at a starting edge of a main scanning delta out of an image writing zone. The position of the synchronous mirror 28 is adjustable to selectively receive one of the laser beams B1–B4. By this arrangement, one of the laser beams B1–B4 is caused to impinge on the synchronous mirror 28 and the reflected of that one laser beam is detected by the synchronous detection sensor 29 each time before the scanning of the surface of the photoconductive drum 2. Upon detecting the one of the laser beams B1–B4, the synchronous detection sensor 29 generates a synchronous detection signal SYNC that is used to determine a start time of image writing in the main scanning direction X.

Figure 5:
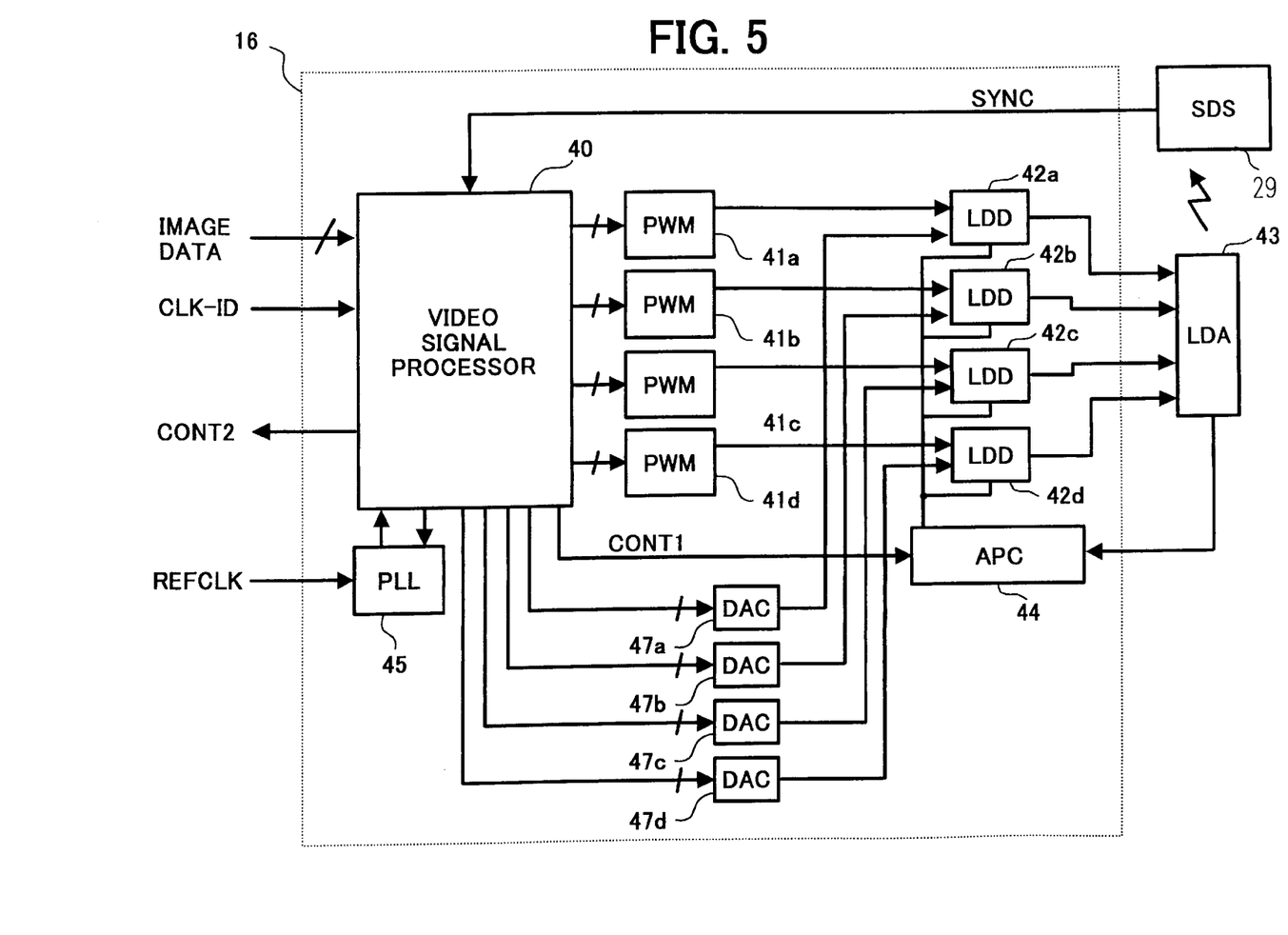
FIG. 5 is a block diagram of an optical writing controller included in the image forming apparatus of FIG. 1.

FIG. 5 shows an exemplary configuration of the optical writing controller 16. As shown in FIG. 5, the optical writing controller 16 includes a video signal processor 40, pulse width modulators (PWMs) 41a–41d, laser diode drivers (LDDs) 42a–42d, an APC (automatic power control) 44, a PLL (phase-locked loop) circuit 45, and digital-to-analog converters 47a–47d. In FIG. 5, the laser diode array device 20 is referred to as an LDA (laser diode array) and the synchronous detection sensor 29 is referred to as an SDS (synchronous detection sensor).

Based on the synchronous detection signal SYNC output by the SDS 29, the video signal processor 40 of the optical writing controller 16 starts to receive image data for four lines with an associated clock signal CLK-ID from an image processing section (not shown). The video signal processor 40 has internal line memories (not shown) and stores the received image data for four lines into the internal line memories, and outputs the image data for four lines at the same time to the PWMs 41a–41d in synchronism with the rotation of the polygon mirror 24.

The PWMs 41a–41d generate signals having pulse widths modulated in accordance with the image data for the respective four lines and output the pulse modulated signals to the LDDs 42a–42d, respectively. The LDDs 42a–42d then drive the four-channel LDs 20a–20d, respectively, of the LDA 20 in accordance with the pulse modulated signals. The APC 44 determines driving voltages for driving the LDDs 42a–42d based on a signal from the PD 31 of the LDA 20 and a control signal CONT1 sent from the video signal processor 40, and applies the determined driving voltages to the LDDs 42a–42d.

When the video signal processor 40 transmits the image data to the PWMs 41a–41d based on the synchronous detection signal SYNC sent from the SDS 29, as described above, the video signal processor 40 also generates a basic timing signal CONT2 used by the image processing section (not shown) for its transmission of the image data for four lines to the video signal processor 40. The DACs 47a–47d control the LDDs 42a–42d, respectively, in accordance with the signals sent from the video signal processor 40 to control light amounts of the LDs 20a–20d, respectively. The PLL circuit 45 receives a reference PLL clock signal REFCLK from a clock signal generator (not shown) and the synchronous detection signal SYNC generated by the SDS 29. Based on these signals, the PLL circuit 45 generates pixel clock signals WCLKa–WCLKd (see FIG. 8) for synchronizing the image data input to the PWMs 41a–41d.

Figure 6:
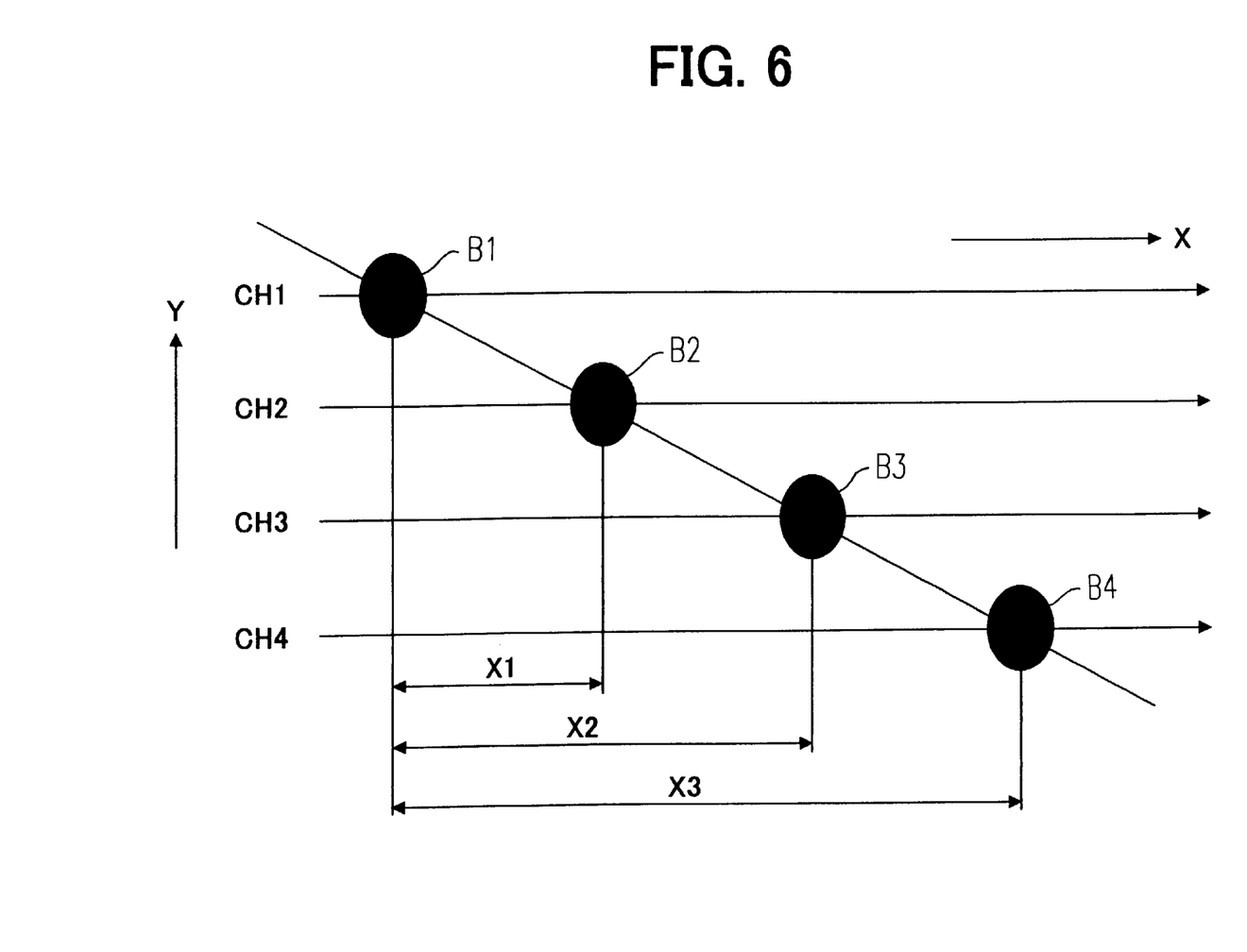
FIG. 6 is an illustration for explaining positional displacements of laser diodes.

FIG. 6 shows positional displacements on the surface of the photoconductive drum 2 in connection with data channels CH1–CH4 of the laser beams B1–B4. In FIG. 6, data channels CH1–CH4 represent data lines in the main scanning direction X scanned by the LDs 20a–20d, respectively. As shown in FIG. 6, the channels CH1 and CH2 have a displacement X1, the channels CH1 and CH3 have a displacement X2, and the channels CH1 and CH4 have a displacement X3.

Figure 7:
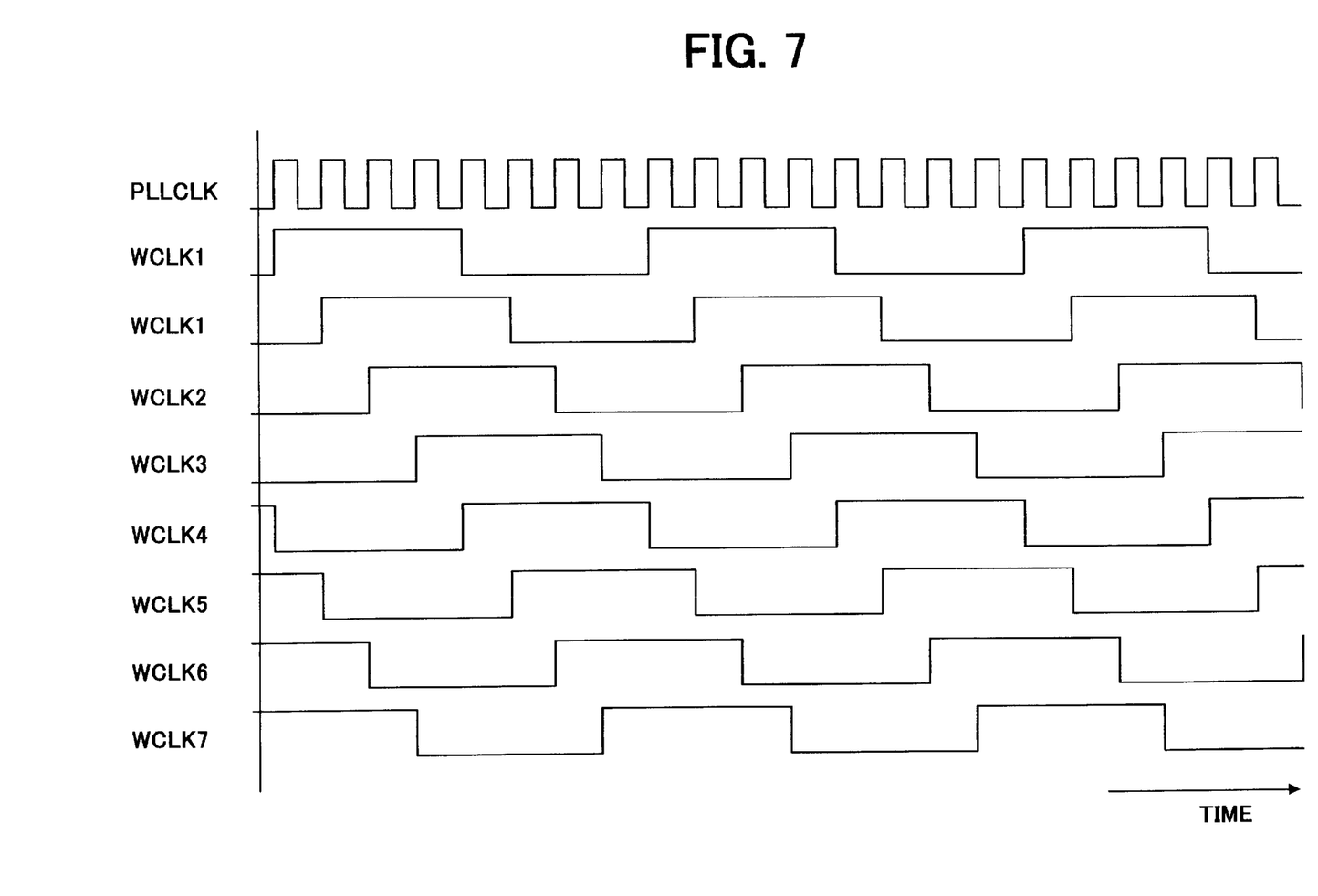
FIG. 7 is a timing diagram showing a relationship between a PLL clock signal PLLCLK and pixel clock signals WCLK1–WCLK7.

FIG. 7 shows a timing chart of a PLL basic clock signal PLLCLK and the pixel clock signals WCLK1–WCLK7. In this case, the PLL circuit 45 sequentially generates pixel clock signals WCLK1–WCLK7 with a one-clock delay relative to PLLCLK to divide a frequency of the PLL basic clock signal into one-eighth the original frequency. One of the pixel clock signals WCLK1–WCLK7 is arbitrarily selected according to an amount of the above-mentioned positional displacements X1–X3.

Figure 8:
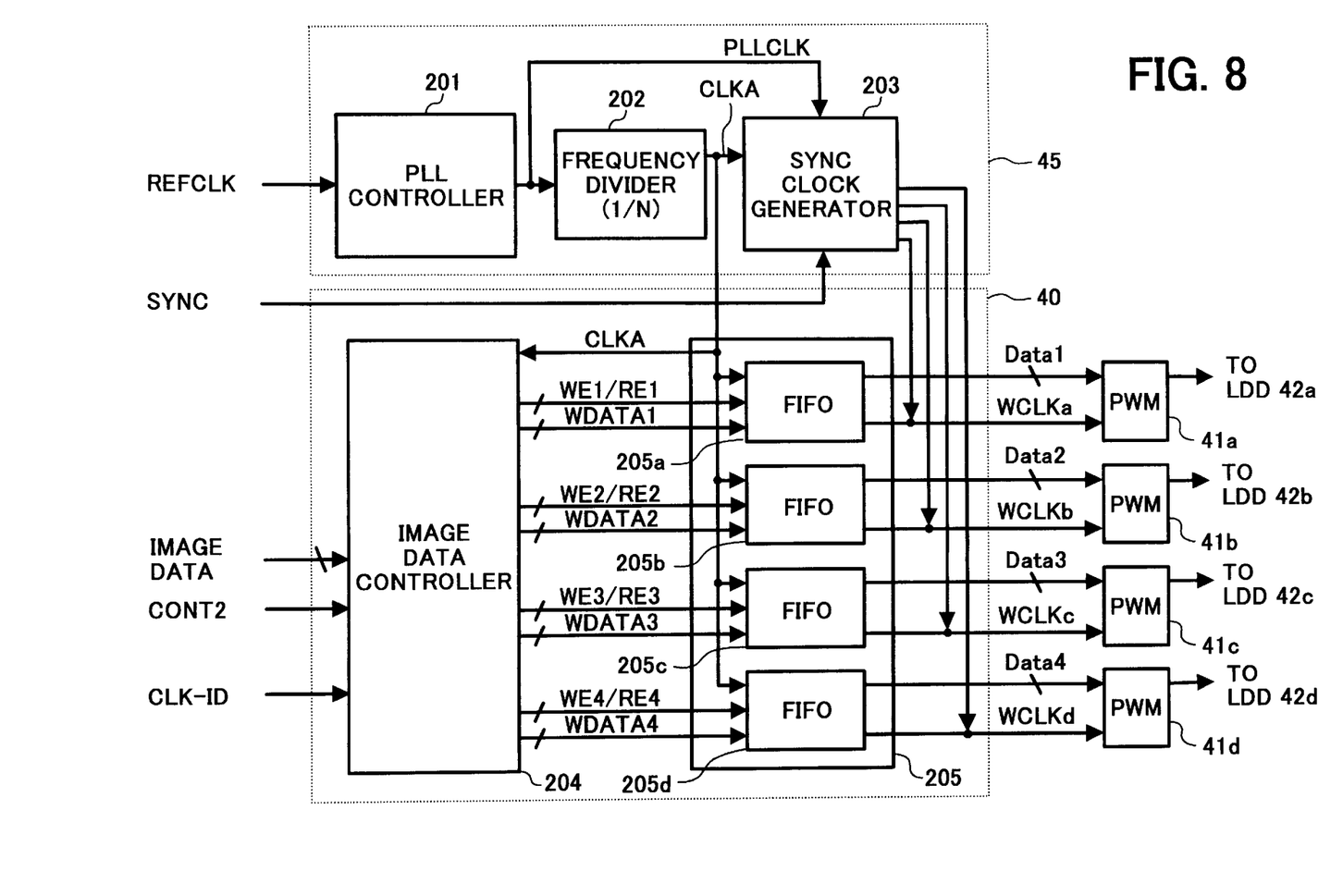
FIG. 8 is a block diagram of a PLL circuit and a video signal processor of FIG. 5.

FIG. 8 shows an exemplary configuration of the PLL circuit 45 and a PWM (pulse width modulation) control portion of the video signal processor 40. As shown in FIG. 8, the PLL circuit 45 includes a PLL (phase-locked loop) controller 201, a frequency divider 202, and a synchronous clock generator 203. The PWM control portion of the video signal processor 40 includes an image data controller 204 and a FIFO (first-in and first-out) circuit 205 that includes FIFOs 205a–205d. In the PLL circuit 45, the PLL controller 201 receives the reference PLL clock signal REFCLK and generates a clock signal PLLCLK that is a frequency-multiplied signal with a VCO (voltage controlled oscillator) 2016 (see FIG. 10) included in the PLL controller 201. The frequency divider 202 divides the clock signal PLLCLK into 1/n, in which n is an integer, and generates a clock signal CLKA that has a 1/n frequency of the clock signal PLLCLK. The synchronous clock generator 203 receives the clock signal PLLCLK from the PLL controller 201, the clock signal CLKA from the frequency divider 202, and the synchronous detection signal SYNC from the SDS 29, and generates the pixel clock signals WCLK1–WCLK7 that sequentially have a phase delay by a clock of the clock signal PLCLK. That is, the pixel clock signals WCLK1–WCLK7 and the clock signal CLKA have the same frequency but have different phases.

One of the pixel clock signals WCLK1–WCLK7 is selected based on the synchronous detection signal SYNC and is output as write clock signals WCLKa–WCLKd from the synchronous clock generator 203 to drive the PWMs 41a–41d to correct the positional displacements X1–X3. In the video signal processor 40, the image data and the associated clock signals sent from the image processing section (not shown) are separated into write data WDATA1–WDATA4 for the channels CH1–CH4, respectively, gated with the clock signal CLKA from the frequency divider 202. The write data WDATA1–WDATA4 of the channels CH1–CH4 are then input to the FIFOs 205a–205d gated with the clock signal CLKA from the frequency divider 202 and write enable signals WE1–WE4 sent from the image data controller 204.

The image data are read out from the FIFOs 205a–205d with the write clock signals WCLKa–WCLKd and read enable signals RE1–RE4 sent from the FIFOs 205a–205d, respectively.

Figure 9:
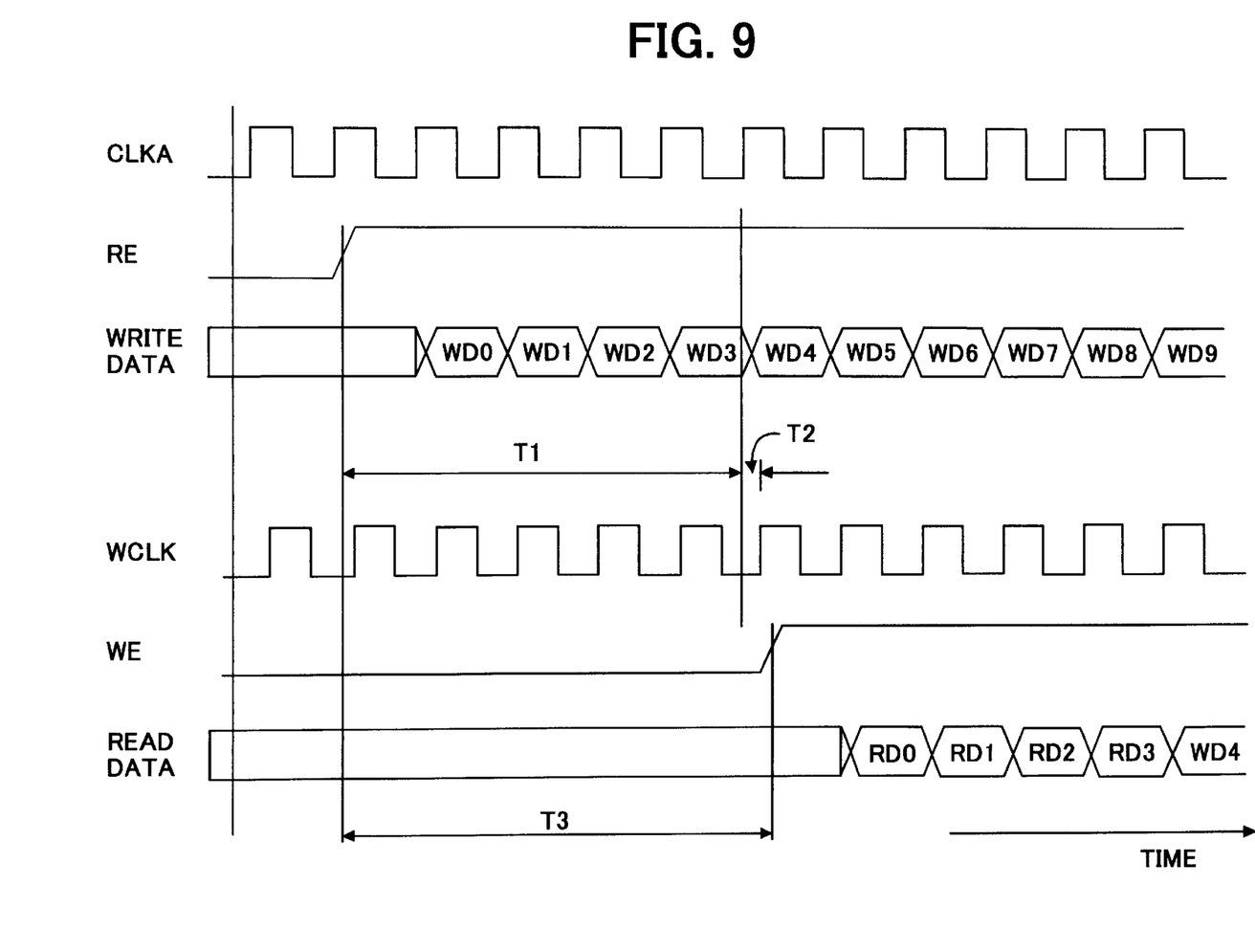
FIG. 9 is a timing diagram for explaining an allowable delay for synchronizing image data between writing and reading.

With the above-described structure, as shown in FIG. 9, a delay in unit of pixels can be set within a time period T1, which is a difference of the rise times between the write enable signal WE and the read enable signal RE. In addition, a phase delay in unit of 1/8 of a dot can be set within a time period T2 by a selection of the write clock signals WCLKa–WCLKd. A total delay to correct an amount of the positional displacement can be set within a total delay T3 composed of the time periods T1 and T2.

Figure 10:
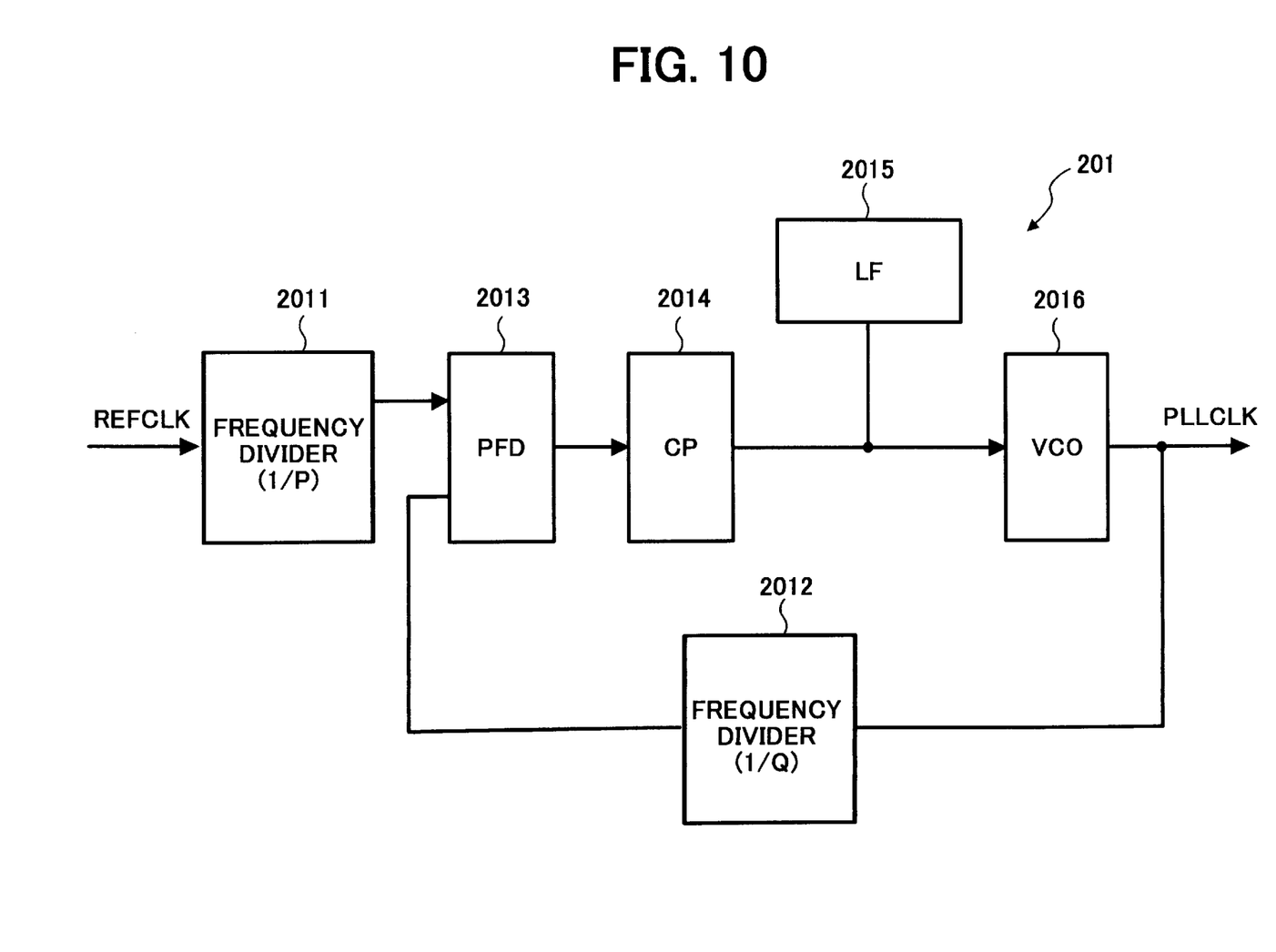
FIG. 10 is a block diagram of a PLL controller included in the PLL circuit of FIG. 8.

FIG. 10 shows an exemplary structure of the PLL controller 201 of the PLL circuit 45. As shown in FIG. 10, the PLL controller 201 includes frequency dividers 2011 and 2012, a phase frequency detector (PFD) 2013, a charge pump (CP) 2014, a loop filter (LF) 2015, and the above-mentioned VCO 2016. The reference PLL clock signal REFCLK is divided into a 1/p clock signal by the frequency divider 2011, in which p is an interger. The 1/p clock signal is input to the PFD 2013 and is compared with a 1/q clock signal of the PLLCLK from the frequency divider 2012, in which q is an integer. The PFD 2013 outputs a signal representing a phase difference between the two clock signals and is converted into an analog signal by the CP 2014. The analog signal output by the CP 2014 is input to the VCO 2016, which oscillates in accordance with the input analog voltage and generates the clock signal PLLCLK.

Figure 11:
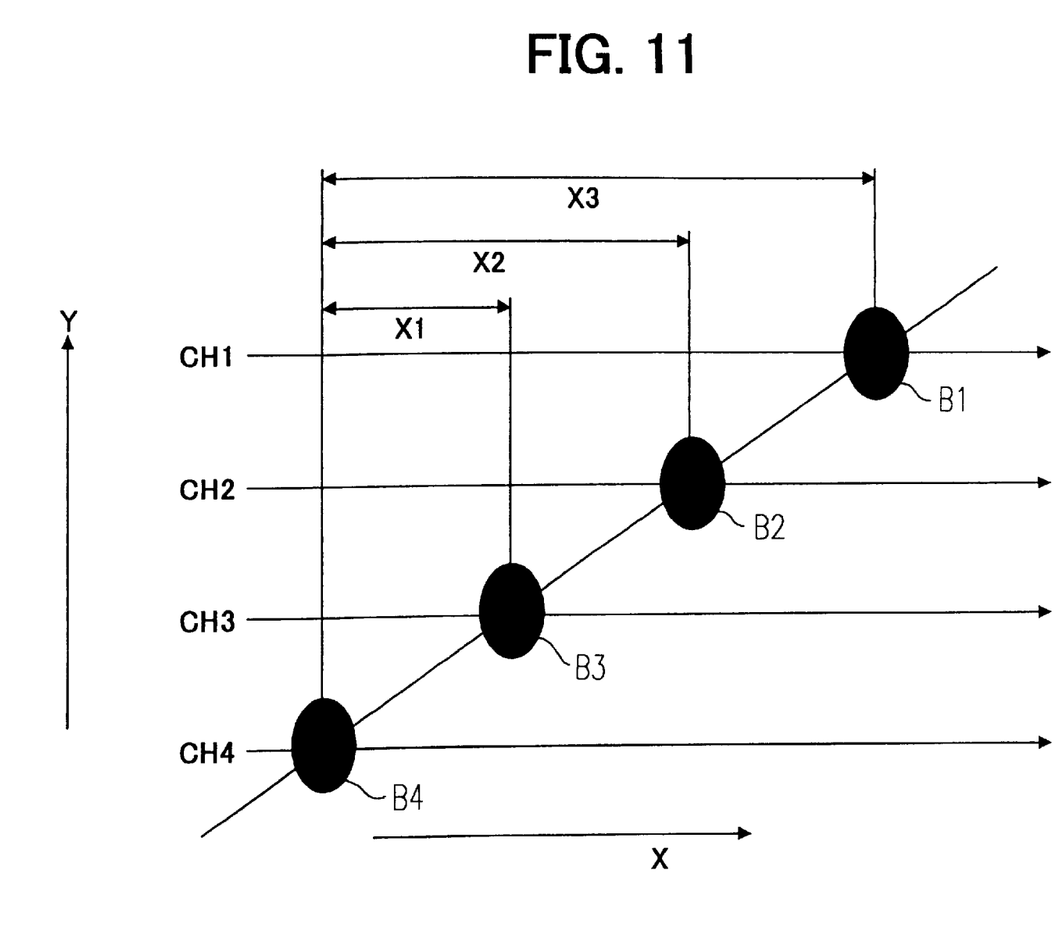
FIG. 11 is an illustration for explaining different positional displacements of the laser diodes.

FIG. 11 shows a case in which the laser beam B4 of the channel CH4 is ahead in the main scanning direction. In this case, the laser beam detection performed by the synchronous detection sensor 29 is made on the laser beam B4 of the channel CH4.

Figure 12:
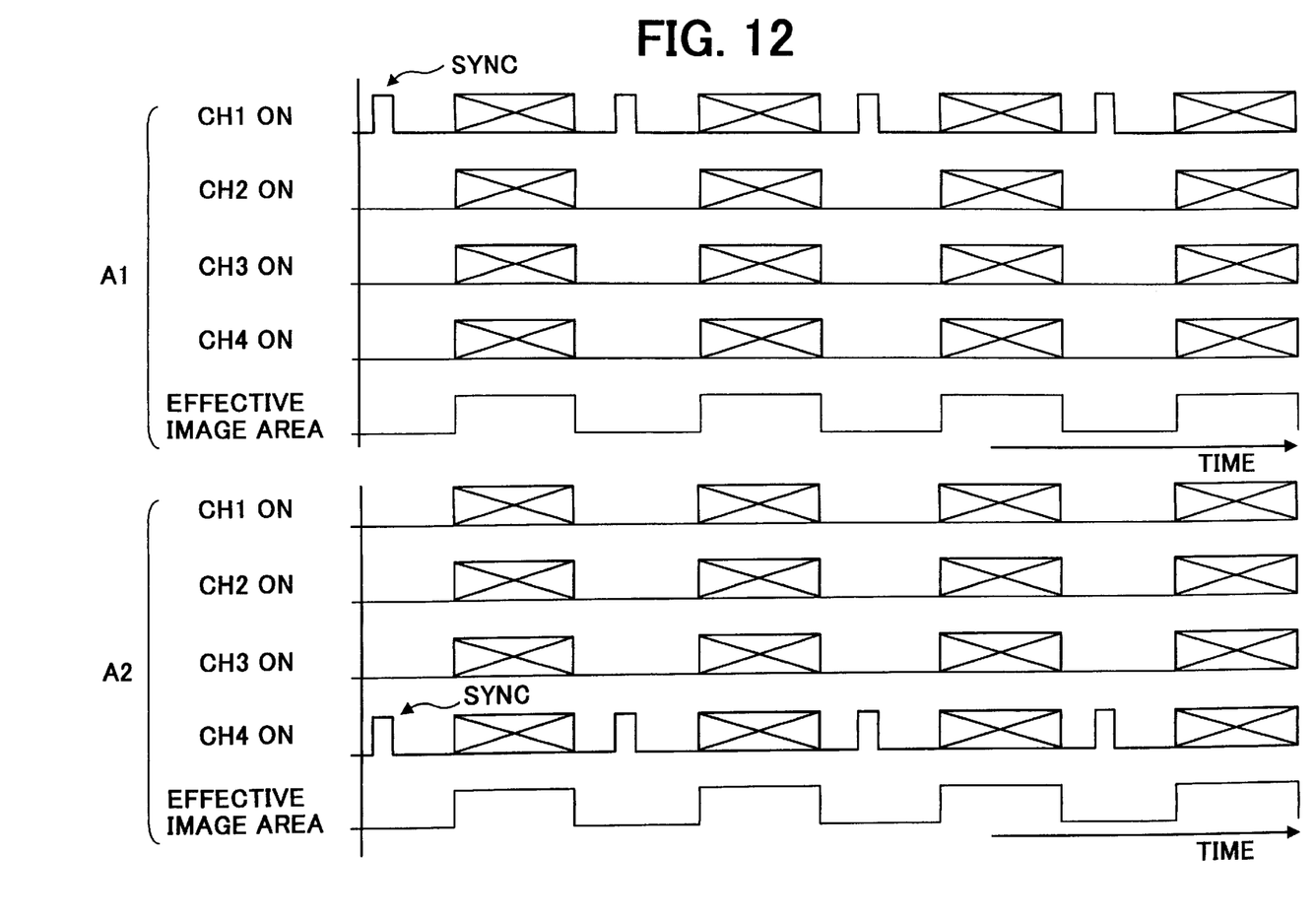
FIG. 12 is timing diagrams for the cases of FIG. 6 and FIG. 11 in comparison.

FIG. 12 shows two timing charts A1 and A2 in comparison. The timing chart A1 represents the case of the operation in which the laser beam B1 of the channel CH1 is ahead in the main scanning direction, as shown in FIG. 6, and the time chart A2 represents the case of the operation in which the laser beam B4 of the channel CH4 is ahead in the main scanning direction, as shown in FIG. 11. Thus, the synchronous detection sensor 29 is arbitrary set to detect a previously determined one of the laser diodes 30 for the channels CH1–CH4.

Numerous additional modifications and variations of the present invention are possible in light of the above teachings. It is therefore to be understood that within the scope of the appended claims, the disclosure of this patent specification may be practiced otherwise than as specifically described herein.

This patent specification is based on Japanese patent application No. JPAP2001-063696 filed on Mar. 7, 2001, in the Japanese Patent Office, the entire contents of which are hereby incorporated by reference herein.

What is claimed is:

1. An image forming apparatus, comprising:
   a light source including a plurality of light emitting elements arranged in line for simultaneously emitting a plurality of parallel light beams, said light source arranged with an angle smaller than 90° relative to a sub-scanning direction of said plurality of parallel light beams;
   a light beam controlling mechanism configured to control said plurality of parallel light beams to simultaneously scan a plurality of lines on a surface of a photoconductive member in a main scanning direction;
   a sensor configured to detect one of said plurality of parallel light beams and to generate a line synchronous signal upon detecting the one of said plurality of parallel light beams; and
   a signal controller configured to synchronize and to modulate a plurality of parallel image data streams that respectively drive said plurality of light emitting elements of said light source to emit said plurality of parallel light beams in accordance with said plurality of parallel image data streams;
   wherein said signal controller comprises:
      a plurality of FIFOs configured to delay said plurality of parallel image data streams, respectively;
      a PLL circuit configured to generate a PLL clock signal having an integral multiple frequency of a pixel clock signal;
      a frequency divider configured to divide said PLL clock signal into a plurality of clock signals having a same frequency and having phases sequentially varied;
      a synchronous clock generator configured to select one of said plurality of clock signals having the same frequency and having the phases sequentially varied; and a plurality of drivers configured to drive said plurality of light emitting elements, respectively, with said one of said plurality of clock signals selected by said synchronous clock generator.

2. An image forming apparatus as defined in claim 1, wherein said light source comprises a laser diode array including a plurality of laser diodes.

3. An image forming apparatus as defined in claim 1, wherein said sensor is further configured to detect a predetermined one of said plurality of parallel light beams.

4. An image forming apparatus as defined in claim 3, wherein said light source comprises a laser diode array including a plurality of laser diodes.

5. An image forming apparatus as defined in claim 3, wherein said predetermined one of said plurality of parallel light beams is a light beam emitted by a light emitting element for scanning a line on a surface of the photoconductive member ahead of other light beams in the main scanning direction.

6. An image forming apparatus as defined in claim 5, wherein said light source comprises a laser diode array including a plurality of laser diodes.

7. An image forming apparatus, comprising:

light source means for simultaneously emitting a plurality of parallel light beams with an angle smaller than 90° relative to a sub-scanning direction of said plurality of parallel light beams;

light beam controlling means for controlling said plurality of parallel light beams to simultaneously scan a plurality of lines on a surface of a photoconductive member in a main scanning direction;

sensing means for detecting one of said plurality of parallel light beams and for generating a line synchronous signal upon detecting the one of said plurality of parallel light beams; and signal controlling means for synchronizing and modulating a plurality of parallel image data streams that respectively drive said light source means to emit said plurality of parallel light beams in accordance with said plurality of parallel image data streams;

wherein said controlling means comprises:

delaying means for delaying said plurality of parallel data streams, respectively;

circuit means for generating a clock signal having an integral multiple frequency of a pixel clock signal;

frequency dividing means for dividing said clock signal into a plurality of clock signals having a same frequency and having phases sequentially varied;

synchronous clock generating means for selecting one of said plurality of clock signals having the same frequency and having the phases sequentially varied; and driving means for driving said plurality of light emitting means, respectively, with said one of said plurality of clock signals selected by said synchronous clock generating means.

8. An image forming apparatus as defined in claim 7, wherein said light source means comprises a laser diode array including a plurality of laser diodes.

9. An image forming apparatus as defined in claim 7, wherein said sensing means further detects a predetermined one of said plurality of parallel light beams.

10. An image forming apparatus as defined in claim 9, wherein said light source means comprises a laser diode array including a plurality of laser diodes.

11. An image forming apparatus as defined in claim 7, wherein said predetermined one of said plurality of parallel light beams is a light beam emitted for scanning a line on a surface of the photoconductive member ahead of other light beams in the main scanning direction.

12. An image forming apparatus as defined in claim 11, wherein said light source means comprises a laser diode array including a plurality of laser diodes.

13. A method of image forming, comprising:

arranging a light source with an angle smaller than 90° relative to a sub-scanning direction of a photoconductive member, said light source including a plurality of light emitting elements in line;

causing said plurality of light emitting elements to simultaneously emit a plurality of parallel light beams;

detecting one of said plurality of parallel light beams and generating a line synchronous signal upon detecting the one of said plurality of parallel light beams;

inputting image data;

providing a PLL clock signal having an integral multiple frequency of a pixel clock signal;

dividing said PLL clock signal into a plurality of pixel clock signals having a same frequency and having phases sequentially varied;

selecting one of said plurality of pixel clock signals having the same frequency and having the phases sequentially varied;

separating said image data into a plurality of parallel data streams;

delaying said plurality of parallel data streams, respectively, with said selected one of said plurality of pixel clock signals;

synchronizing said plurality of parallel image data streams with said selected one of said plurality of pixel clock signals;

modulating a plurality of driving signals with said plurality of parallel image data streams; and driving said plurality of light emitting elements with said synchronized plurality of parallel image data streams, respectively.

14. A method as defined in claim 13, wherein said arranging arranges a laser diode array including a plurality of laser diodes.

15. A method as defined in claim 13, wherein said detecting detects a predetermined one of said plurality of parallel light beams.

16. A method as defined in claim 15, wherein said arranging arranges a laser diode array including a plurality of laser diodes.

17. A method as defined in claim 13, wherein said predetermined one of said plurality of light beams is a light beam emitted by a light emitting element for scanning a line on a surface of the photoconductive member ahead of other light beams in the main scanning direction.

18. A method as defined in claim 17, wherein said arranging arranges a laser diode array including a plurality of laser diodes.

* * * * *